United States Patent
Von Tish et al.

(10) Patent No.: US 12,014,139 B2
(45) Date of Patent: *Jun. 18, 2024

(54) METHODS FOR POLYMORPHIC DATA IN SPREADSHEETS

(71) Applicant: Oracle International Corporation, Redwood Shores, CA (US)

(72) Inventors: Kelsey Von Tish, Cambridge, MA (US); Edmund Alex Davis, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,608

(22) Filed: Feb. 27, 2023

(65) Prior Publication Data

US 2023/0214587 A1 Jul. 6, 2023

Related U.S. Application Data (63) Continuation of application No. 17/240,758, filed on Apr. 26, 2021, now Pat. No. 11,636,255.

(51) Int. Cl.
| | |
|---|---|
| G06F 17/00 | (2019.01) |
| G06F 16/951 | (2019.01) |
| G06F 40/103 | (2020.01) |
| G06F 40/174 | (2020.01) |
| G06F 40/18 | (2020.01) |
| G06F 40/186 | (2020.01) |

(52) U.S. Cl.
CPC ............ *G06F 40/18* (2020.01); *G06F 16/951* (2019.01); *G06F 40/103* (2020.01); *G06F 40/174* (2020.01); *G06F 40/186* (2020.01)

(58) Field of Classification Search
None
See application file for complete search history.

(56) References Cited

U.S. PATENT DOCUMENTS

| | | | | |
|---|---|---|---|---|
| 6,157,934 | A * | 12/2000 | Khan | G06Q 10/10 715/769 |
| 2020/0097534 | A1 * | 3/2020 | Von Tish | G06F 40/177 |
| 2020/0167321 | A1 * | 5/2020 | Sheehan | G06F 21/6209 |

* cited by examiner

*Primary Examiner* — Mustafa A Amin
(74) *Attorney, Agent, or Firm* — Trellis IP Law Group, PC (57) ABSTRACT

A spreadsheet user interface shows polymorphic records. The records include global fields, discriminator fields, and context-sensitive fields. A context-sensitive field is available or unavailable dependent on a discriminator field value. Record fields associate with spreadsheet columns, regardless of field availability. User confusion is prevented by marking a record's unavailable context-sensitive fields as unavailable and visually distinguishing them from available fields. A user-requested operation spanning multiple rows and columns is supported by testing whether a source cell and source data is available, a destination cell is available, and skipping the operation for those records whose source and/or destination cell is required but unavailable. An embodiment supports interfacing with a single record in a spreadsheet form by applying global form templates associated with global fields, and context-dependent form templates associated with specific discriminator field values.

24 Claims, 8 Drawing Sheets

```
struct MONOMORPHICREC {
    int       ID,
    typeId_1  fixedFieldName_1,
       ⋮         ⋮
    typeId_N  fixedFieldName_N,
    objID_1   fixedObjectName_1,
       ⋮         ⋮
    objId_M   fixedObjectName_M
} monorec;
```

320

```
struct POLYMORPHICREC {
    int        ID,
    typeId_1   globalFieldName_1,
       ⋮          ⋮
    typeId_N   globalFieldName_N,
    objID_1    globalObjectName_1,
       ⋮          ⋮
    objID_M    globalObjectName_M,
    int        discriminatorFieldName_1,
    objID_M+1  contextSensitiveObj_1,
       ⋮          ⋮
    int        discriminatorFieldName_P,
    objID_M+P  contextSensitiveObj_P,
} polyrec;
```

| ID | Name | Country | State | Province | Territory |
|----|----------|---------|-------|----------|-----------|
| 1  | Pierce, J. | USA | CA | | |
| 2  | White, B.  | Canada | | BC | |
| | | | | | |

EMPLOYEE  White, B
ID:  2
Country:  Canada

Province:  BC

METHODS FOR POLYMORPHIC DATA IN SPREADSHEETS

CROSS REFERENCES TO RELATED APPLICATIONS

This application is a continuation of U.S. patent application Ser. No. 17/240,758, entitled "Methods for Displaying And Interfacing with Polymorphic Database Objects in Spreadsheets", filed on Apr. 26, 2021, which is hereby incorporated by reference as if set forth in full in this application for all purposes.

This application is further related to U.S. patent application Ser. No. 16/145,029, entitled "Editable Table in A Spreadsheet Integrated with A Web Service", filed on Sep. 27, 2018, which is hereby incorporated by reference as if set forth in full in this application for all purposes.

BACKGROUND

In many situations, databases and other information sources are accessed from a cloud-based service, where the database or information service is hosted by a cloud service provider, and users access the data via Internet or another network from a client device. Services are often provided as a REST-compliant service to maximize accessibility. To view and interface with the data, users may use a dedicated database access program, or alternately, an application that is already installed and available on their device, such as a spreadsheet program that may be enhanced with an add-on or extension to provide the required functionality. Programs available include Microsoft Excel, Apache OpenOffice Calc, and LibreOffice Calc, which can all be enhanced with add-ons and extensions using languages such as C#, Visual Basic for Applications, OpenOffice BASIC, and Python.

Databases and other sources (service endpoints) may provide monomorphic data (all records have the same size and structure) or polymorphic data (the size and structure of records is context sensitive and depends on the value of one or more discriminator fields). For instance, an employee database may hold records for an organization's employees worldwide. But residential addresses in different countries and regions may have different formats. The employee database may also hold information regarding the employees' taxes and benefits, and again the structure of that information can vary widely dependent on the country or region. Further, some employees may have joined via a merger or acquisition, and their legacy information may have a different structure than for other employees who were directly employed by the organization.

Until now, spreadsheets have only been useful as a frontend for monomorphic data. Monomorphic records map easily onto a spreadsheet: its columns associate with data structure fields, and its rows can each carry one record. User interaction is intuitive—a user easily knows the meaning of a cell, and can interact with it as requires. This includes performing bulk operations spanning multiple records, like creating new records by replicating parts of existing records, or modifying existing records by pasting information copied from a source record, or by performing a range fill that spans multiple records. Bulk operations that a user can perform include both database operations and spreadsheet-specific operations. In the latter case, the user first performs a spreadsheet operation such as a range fill on a range of cells, and then commits those local changes to the service endpoint, e.g., through a REST request.

For polymorphic data, spreadsheets have not been useful. Although of course records can still be associated with spreadsheet rows, for fields it is not straightforward. If fields are mapped to the minimum number of columns, it would require using a column differently dependent on the context of a record. This is very confusing for users, and it all but precludes multirow operations, which would carry a great risk of introducing database errors. If fields are mapped to the maximum number of columns, i.e., a column associates with no more than one field, the risk for multirow operations is resolved. But it may still be confusing to the user that some cells might be inoperable dependent on the context.

Embodiments of the invention set out to resolve the above problems and provide an intuitive and risk-free polymorphic database frontend in spreadsheet environments and applications.

SUMMARY

In many situations, databases and other information sources are accessed from a cloud-based service, where the database or other source is hosted by a cloud service provider, and users access the data via Internet or another network from a client device. The service endpoint (at the cloud service provider location) may deliver its data in the form of records, whose structure may be defined by metadata. It is convenient for users to access multiple records simultaneously in a table format, such as a spreadsheet table, and to access a single record in a form format. A spreadsheet offers a user interface suitable for both, and conveniently familiar to many users. Until now, spreadsheets were only suitable for monomorphic data, i.e. data where all records have the same fields. Attempts to show records from polymorphic data were confusing to users, and therefore unsuccessful. Embodiments of the invention may run on a client device that accesses data services in the cloud, or they may run on a standalone computer that includes both a data source application and a spreadsheet environment or application.

In a first aspect, an embodiment provides a method for displaying polymorphic records in a spreadsheet table on a computer display screen. The computer performs the method and shows the spreadsheet table in a graphical user interface on the display screen. The method retrieves records from the data source and associates a first record with a first table row. It determines the record structure based on a discriminator field value and marks cells for available fields as available, and for unavailable (context-sensitive) fields as unavailable. It populates the available fields and makes unavailable fields visually distinct from available fields. It repeats these steps for all retrieved records, and displays the spreadsheet table. Some embodiments retrieve service metadata that provides information to determine the record structure. The service data may include polymorphic information (global fields, discriminator fields, context-sensitive fields, and a mapping between discriminator field values and context-sensitive fields).

The method further provides for receiving and processing a user requested operation spanning multiple rows and/or columns. The method iterates cells in target rows and target columns. It determines if a source cell and/or data is required and available. If required but not available, the method skips the operation. If the destination cell is not available, the method skips the operation. If the operation requires a match of source and target cell datatypes, and there is no match, the method skips the operation. Otherwise, the method performs the operation and repeats the steps for the next target field and record. After completion, the embodiment waits for a user command to commit the changes. Upon receiving the user command, the embodiment changes the records associated with the target rows in those fields associated with the target records to reflect the changes in the cells and commits the changed records to the data source.

In a second aspect, an embodiment provides a method for displaying a polymorphic record in a spreadsheet form on a computer display screen. The method includes showing labels for global fields according to a global form template. It sets data types and values for the record's global fields in accordance with the global form template, which specifies cell locations and formatting for global fields. The method iterates discriminator fields, where the value of each discriminator field specifies a context-dependent template associated with the discriminator field. Based on the discriminator field value, the method shows labels for available context-sensitive fields in accordance with the context-dependent template. It then sets data types and values for the record's available context-sensitive fields in accordance with the context-dependent template, which specifies cell locations and formatting for available context-sensitive fields. Some embodiments retrieve service metadata that provides information to determine the record structure. The service data may include polymorphic information (global fields, discriminator fields, context-sensitive fields, and a mapping between discriminator field values and context-sensitive fields). The service data may further include the global form template and context-dependent templates. The embodiment may further include dynamically redrawing a spreadsheet form when a user changes a discriminator field value, including the relevant context-sensitive fields from a new context-dependent template associated with the new discriminator field value.

In a third aspect, an embodiment provides a system for displaying polymorphic records in a spreadsheet table. The system comprises a data storage device with non-transitory memory storing the polymorphic data, an application server to access the data, a web server to provide access to the application server through a data network, and a client device that accesses the web server through the data network. The client device includes one or more processors, a short-term memory, a non-transitory long-term memory, a network interface coupled to the data network, a data bus coupled with the one or more processors, short-term memory, long-term memory, network interface, and is coupled directly or indirectly with the computer display screen. The client device performs the method described above for the first aspect of the embodiment, and may further perform the method described above for the second aspect of the embodiment.

In a fourth aspect, an embodiment provides a tangible non-transitory processor-readable medium including instructions executable by one or more processors for displaying polymorphic records in a spreadsheet table on a computer display screen. The instructions are operable to perform the method described above for the first aspect of the embodiment, and may further perform the method described above for the second aspect of the embodiment.

A further understanding of the nature and the advantages of embodiments disclosed herein may be realized by reference of the remaining portions of the specification and the attached drawings.

BRIEF DESCRIPTION OF THE DRAWINGS

The invention will be described with reference to the drawings, in which.

In the figures, like reference numbers may indicate functionally similar elements. The systems and methods illustrated in the figures, and described in the Detailed Description below, may be arranged and designed in a wide variety of different embodiments. Neither the figures nor the Detailed Description are intended to limit the scope as claimed. Instead, they merely represent examples of different embodiments of the invention.

DETAILED DESCRIPTION

Terminology

REST Web Service—REpresentational State Transfer, an architectural style for providing standards for communication between computer systems on Internet. REST-compliant systems are often called RESTful systems. Information is available on Internet, for example on www.codecademy.com/articles/what-is-rest.

Monomorphic data objects—records, or other data objects, whose structure is fixed and independent of their content.

Polymorphic data objects—records, or other data objects, that may include context-sensitive data. Such records may include one or more global fields, one or more discriminator fields and one or more context-sensitive fields, wherein available context-sensitive fields are dependent on the value of a discriminator field. Thus, two records may have different context-sensitive fields if they have a different value in one of their discriminator fields.

Global fields—fields that pertain to every object in a range of polymorphic objects.

Discriminator Field—a field whose value may be one of a predetermined list, determining a set of context-sensitive fields. When the value of the discriminator field changes, the number, meanings, and data types of context-sensitive fields may change, and thus the shape of the object may change. Discriminator fields may be a subset of the global fields.

Context-Sensitive Field—a field whose meaning, datatype, and size is associated with a particular value of a discriminator field. A context-sensitive field may be present for one or more particular values of the discriminator field, and absent for other values.

Metadata—data that defines or provides additional information about other data. In the context of the current patent document, metadata may, for example, be used to describe the structure of monomorphic and polymorphic data objects, templates, and services, and mappings between discriminator field values and context-sensitive fields and templates.

Transitory Memory—a memory whose data content must be considered signals, i.e. of temporary nature and disappearing when the memory's power supply is removed. Transitory memory includes memories like static random-access memory (SRAM) and dynamic random-access memory (DRAM).

Non-transitory Memory—a memory whose data content can be arbitrarily long and is independent of the availability of the memory's supply power. Non-transitory memory includes non-volatile memories like read-only memory (ROM), flash memory, magnetic random-access memory (MRAM), magnetic disks, optical disks including compact disks (CDs), digital video disks (DVDs), and Blu-ray disks.

The Inventive Concept

Embodiments of the invention provide a user interface for records from a polymorphic data source using a spreadsheet table view. The records include global fields, including discriminator fields, and context-sensitive fields. In a record, a context-sensitive field is available or unavailable dependent on a value of a discriminator field. Embodiments may associate fields with spreadsheet columns, regardless of field availability in a specific record, and records with spreadsheet rows. The embodiment prevents user confusion by marking a record's unavailable context-sensitive fields as unavailable and visually distinguishing them from global fields and available context-sensitive fields. The invention supports a user-requested operation spanning multiple rows and/or multiple columns by testing whether a source cell and/or data is available, and a destination cell is available, and skipping the operation for those records whose source and/or destination cell is not available or whose source and destination cell data types do not match. An embodiment may further support interfacing with a single record from a polymorphic data source using a spreadsheet form view by applying global form templates associated with global fields, and context-dependent form templates associated with specific discriminator field values.

EMBODIMENTS

Figure 1:
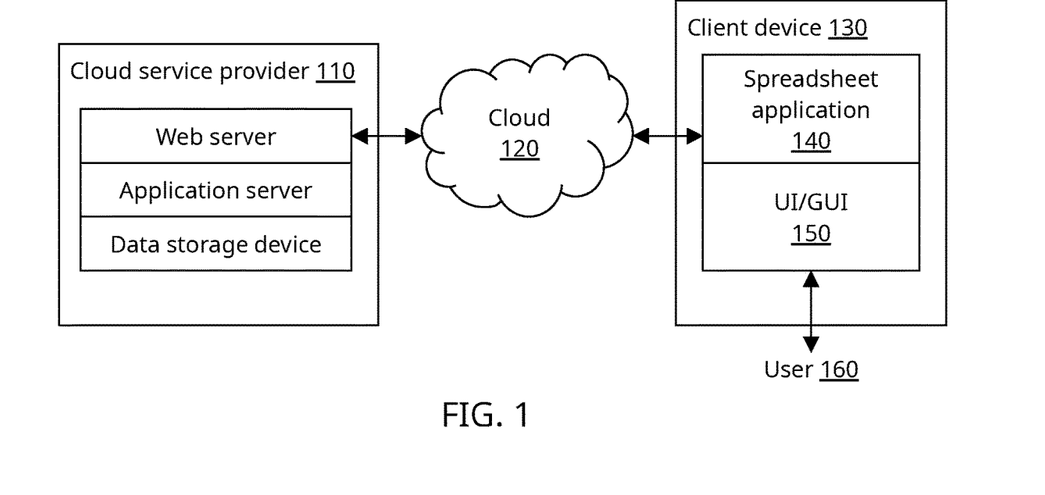
FIG. 1 illustrates an example system suitable for providing a user interface according to embodiments of the invention.

FIG. 1 illustrates an example system 100 suitable for providing a user interface according to embodiments of the invention. System 100 includes cloud service provider 110, using a data storage device to store a database or other data source, an application server to provide access to the database or other data source, and a web server (the service endpoint) to provide the access remotely via cloud 120, which may be or include Internet, a wide area network, a local area network, a wireless network, a company intranet, or any other data network. Cloud service provider 110 provides its services to user 160 via client device 130, which runs spreadsheet application 140 and which provides a user interface and graphical user interface UI/GUI 150. Client device 130 may be any type of user device, including but not limited to a personal computer, a tablet, and a smartphone. Spreadsheet application 140 may be any spreadsheet application or other software application operable to display a table view, i.e., a visualization providing cells arranged in rows and columns.

Figure 2:
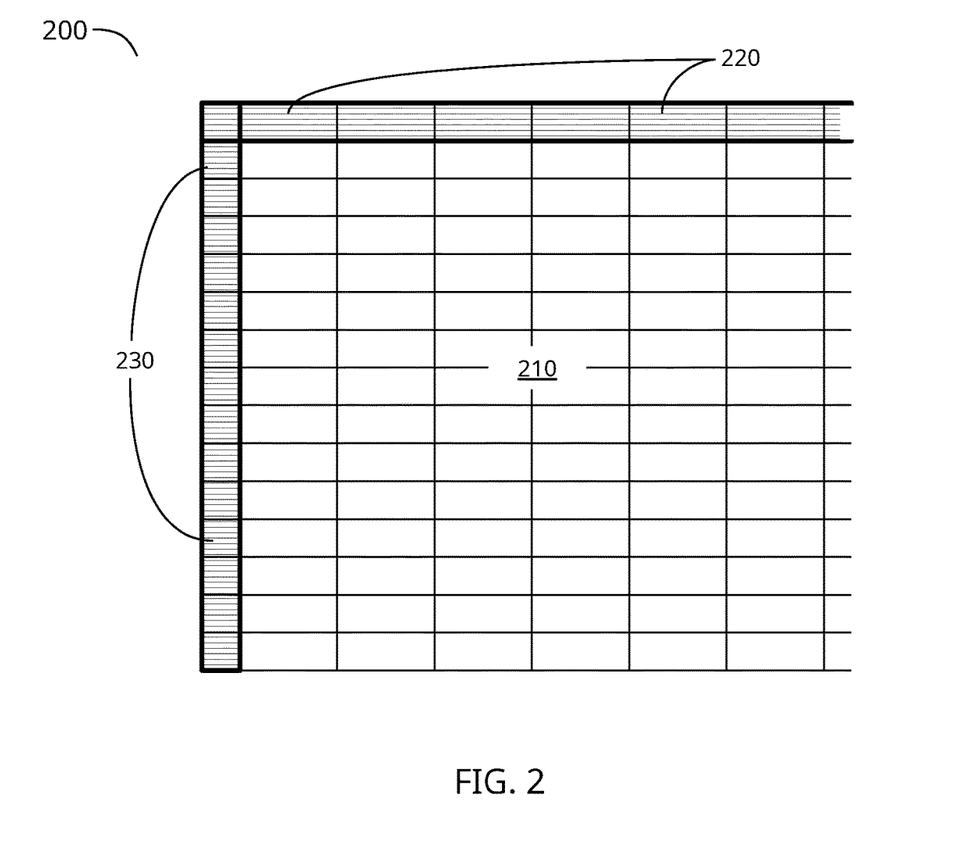
FIG. 2 illustrates an example spreadsheet page.

FIG. 2 illustrates an example spreadsheet page 200. Spreadsheet page 200 includes a cell area 210 with cells arranged in rows and columns. A cell can hold and display data, for example a text, a number, a date, a time, a Boolean value, an image, or any other data type. In many cases, a cell is configured to hold data of a certain data type, or the cell or spreadsheet application determines the data type when data is loaded or entered into the cell. A cell may be editable, i.e., it can receive data from user input, but the cell can be set to read-only, write-only, or read-write. A cell may also be protected from changes, so that no data entry is possible. In many cases, a cell's visual attributes can be set, so that cells can be visually distinct from other cells. For example, their background or foreground color can be set, the font, font size, and font attributes can be set. At the top of each column of cells may be a column header 220, and to a side of each row, for example the left-hand side, may be a row header 230. A column header 220 can identify the column, for example by displaying a column number or column letter combination, and it also allows a user to select all cells in the column. A row header 230 can identify the row, for example by displaying a row number or row letter combination, and it also allows a user to select all cells in the row. In some cases, a column header 220 or row header 230 can display text to identify the data in the associated column or row.

Figure 3:
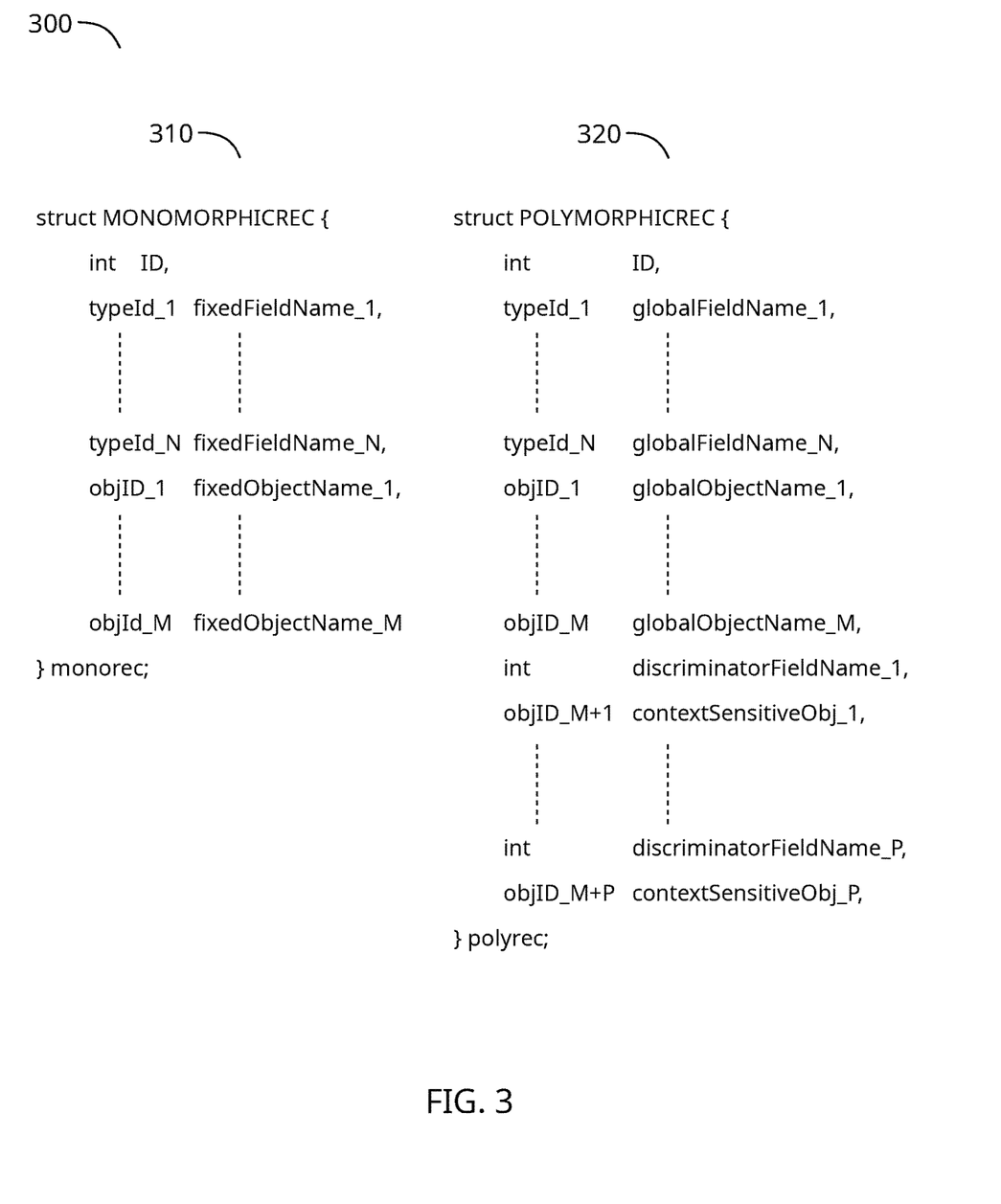
FIG. 3 illustrates differences between an example monomorphic record and an example polymorphic record.

FIG. 3 illustrates differences 300 between an example monomorphic record 310 and an example polymorphic record 320. The examples are shown in a C struct format, but records may be defined in any computer language suitable for data services applications. Monomorphic record 310 includes a fixed number of fields, each having a fixed data type, and a fixed size. The size may be defined by the data type. For example, an integer (int) may be four bytes long. The example shows that monomorphic record 310 begins with an integer for a field called "ID", which may be a unique record identifier inside a database or other application. It is followed by a field called "fixedFieldName_1" of which the data type is shown as "typeId_1", which may be any of the data types available in the database or other application. For example, it could be a short text up to 16 characters, a medium-length text up to 64 characters, an integer, a long integer, a floating-point number, a date, etc. etc. The example shows a record with N+1 fixed fields (including the ID), but embodiments may have any number of fixed fields. Additionally, monomorphic record 310 may include zero or more objects, which each by themselves are monomorphic data structures, and therefore have a fixed form and length. In general, monomorphic record 310 may include a hierarchy of monomorphic data structures. All field names are unique (at their hierarchical level), and field names may be anything within the bounds of the application.

Unlike monomorphic record 310, polymorphic record 320 does not need to have a fixed length and form. It may include anything that could be included in a monomorphic record, but additionally it includes one or more discriminator fields (the example shows P discriminator fields), each associated with at least one context-sensitive object. A context-sensitive object may have a monomorphic structure dependent on the value of the associated discriminator field. For example, if the associated discriminator field may have one of a list of V values, then the context-sensitive object may be any one of a list of V different structures. These V different structures may have different forms and lengths, meaning that their number of fields may be different, the names and data types for the fields may be different, and the sizes for the fields may be different. The V different structures may be monomorphic or polymorphic, and may be hierarchically nested. Thus, the total size of the polymorphic structure may vary dependent on the value of at least one discriminator field. Again, the names of the discriminator fields may be anything within the bounds of the application.

Figure 4:
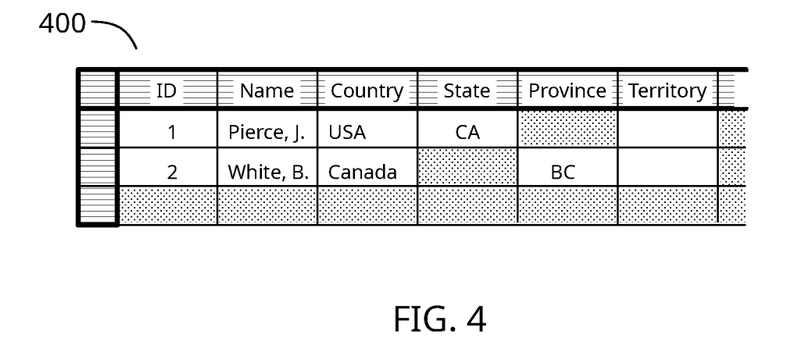
FIG. 4 illustrates a spreadsheet table displaying multiple polymorphic records according to an embodiment of the invention.

FIG. 4 illustrates a spreadsheet table 400 displaying multiple polymorphic records according to an embodiment of the invention. The embodiment associates columns with unique fields, and rows with individual records. This example shows two polymorphic records (on two subsequent rows), each having three global fields (ID, Name, and Country), of which Country is also a discriminator field. The example shows two instances of one polymorphic object, i.e., an object whose fields are dependent on the discriminator field value. As illustrated, if the discriminator field (Country) has a value of "USA", then the polymorphic object includes a field named "State" and if the discriminator field value is "Canada", then the polymorphic object includes a field named "Province". In contrast, if the discriminator field (Country) has a value of "USA", then the polymorphic object does not include the field named "State" and if the discriminator field value is "Canada", then the polymorphic object does not include the field named "Province". Thus, dependent on the row (record), the fields "State" and "Province" may or may not be available. To eliminate user confusion, the embodiment visually distinguishes unavailable fields, for example as shown by giving them a different background shading. A user can only edit cells for fields that are available, and only cells for available fields may show a value. In the embodiment shown, the third row, for which no record is available, has no fields available, so all cells are shown as not available. Also, columns past the sixth column are not associated with any fields, and therefore the embodiment shows their cells as not available. A user may edit in available cells. However, a user may also perform an operation on a range of cells, which may span multiple columns and multiple rows, and include cells for fields that are not available. Embodiments perform the operation for cells that are available, as further detailed with reference to FIGS. 7A-B.

Figure 5:
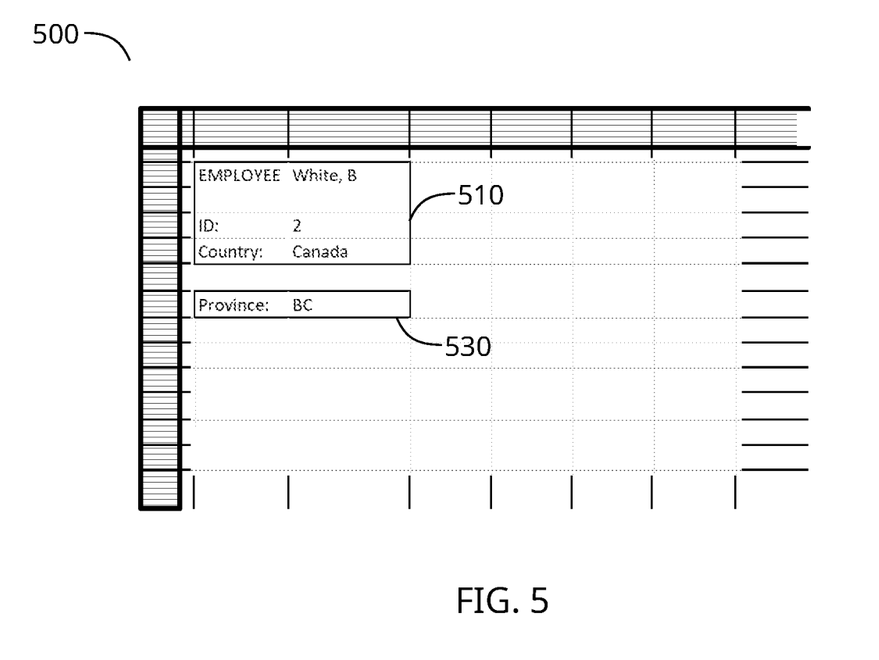
FIG. 5 illustrates a form in a spreadsheet displaying a polymorphic record according to an embodiment of the invention.

FIG. 5 illustrates a form 500 in a spreadsheet displaying a polymorphic record according to an embodiment of the invention. In this example embodiment, the form displays a single record, but other embodiments may display more than one record. Form 500 uses a global template 510 for displaying labels ("EMPLOYEE", "ID", and "Country") and values ("White, B", 2, and "Canada") associated with global fields, and a context-dependent template 530 for displaying labels ("Province") and values ("BC") associated with context-sensitive fields. Context-dependent templates may have varying sizes since the number of context-sensitive fields may depend on the context, i.e. on the value of the discriminator field. An embodiment may dynamically resize the user interface to contain a relevant set of context-sensitive fields or to contain the relevant context-dependent template(s). In general, since an embodiment may include multiple discriminator fields, form 500 could use multiple different context-sensitive templates to display context-sensitive data.

Figure 6:
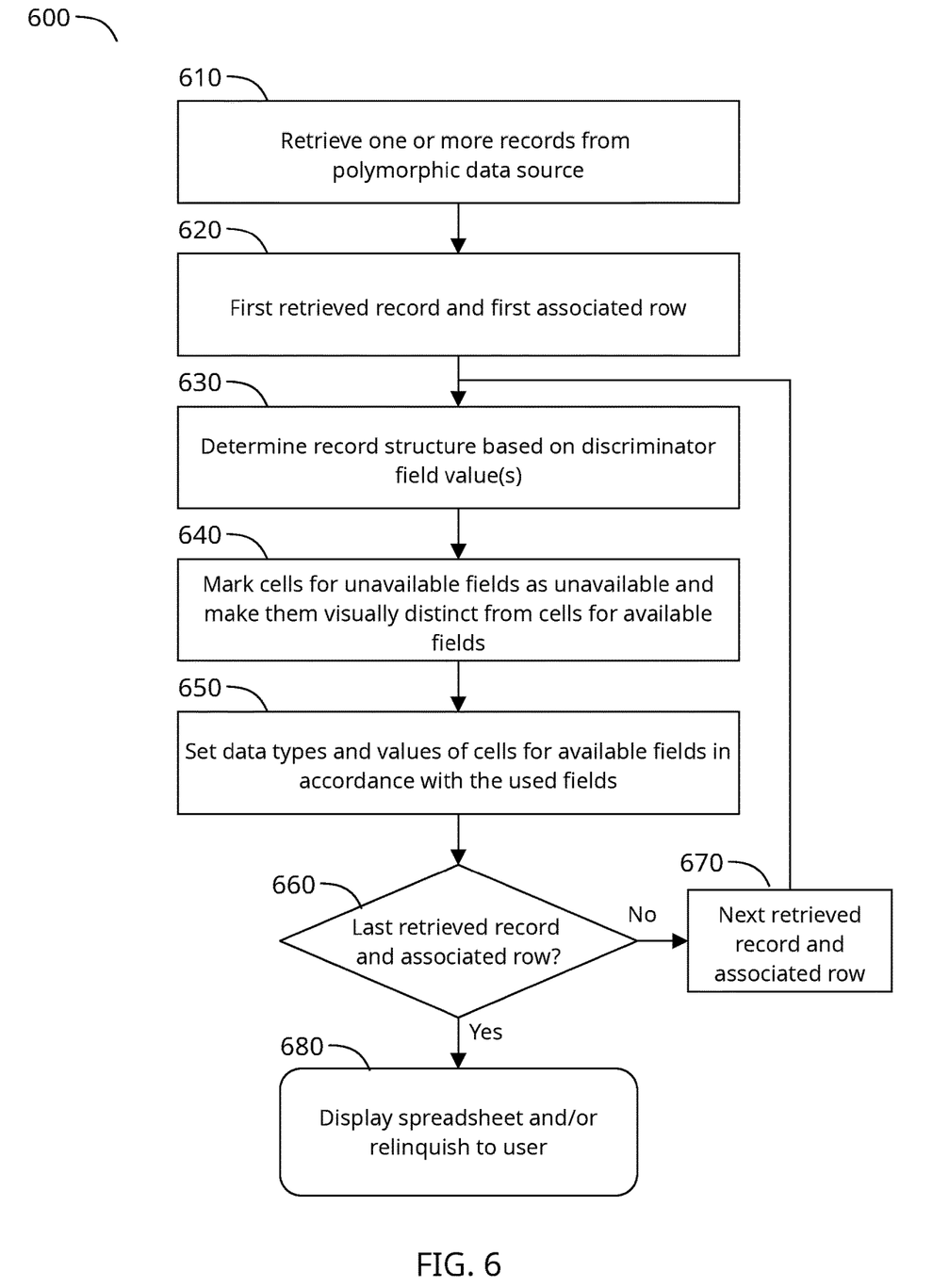
FIG. 6 illustrates an example method for displaying polymorphic records in a spreadsheet table according to an embodiment of the invention.

FIG. 6 illustrates an example method 600 for displaying polymorphic records in a spreadsheet table according to an embodiment of the invention. The spreadsheet includes cells organized in rows and columns, or more generally, organized in two dimensions that are orthogonal to each other. The spreadsheet table associates cells with records in a first dimension (for example, along rows) and with record fields in a second dimension (for example, along columns). Method 600 comprises the following steps.

Step 610—retrieving one or more records from a polymorphic data source.

Step 620—associating a first retrieved record with a first table row. The embodiment marks the first retrieved record as the current record, and the first table row as the current row.

Step 630—determining a record structure based on a discriminator field value in the current record. The record structure specifies available fields (global fields and available context-sensitive fields) and unavailable (context-sensitive) fields. When the record includes multiple discriminator fields, the embodiment determines the record structure based on the values of the multiple discriminator fields. Some embodiments retrieve service metadata that provides information to determine the record structure. The service metadata may include polymorphic information (global fields, discriminator fields, context-sensitive fields, and a mapping between discriminator field values and context-sensitive fields).

Step 640—associating fields in the current record with cells in the current row, and marking cells associated with unavailable fields as unavailable, and making them visually distinct from cells associated with available fields. An embodiment may disable unavailable cells and enable available cells.

Step 650—setting data types and values of cells for available fields in accordance with those available fields.

Step 660—determining if the last retrieved record has been associated with a table row.

Step 670—upon determining that the last retrieved record has not been associated with a table row, associating a next retrieved record with a next table row, marking the next retrieved record as the current record and the next table row as the current row, and returning to Step 630.

Step 680—upon determining that the last retrieved record has been associated with a table row, displaying the spreadsheet table and/or relinquishing control to the user. Some embodiments may continuously show the spreadsheet table, and visually update its cells in the prior steps. Other embodiments may update and/or display the spreadsheet table only after Step 670. All embodiments, in Step 680, relinquish control to the user.

Figure 7A:
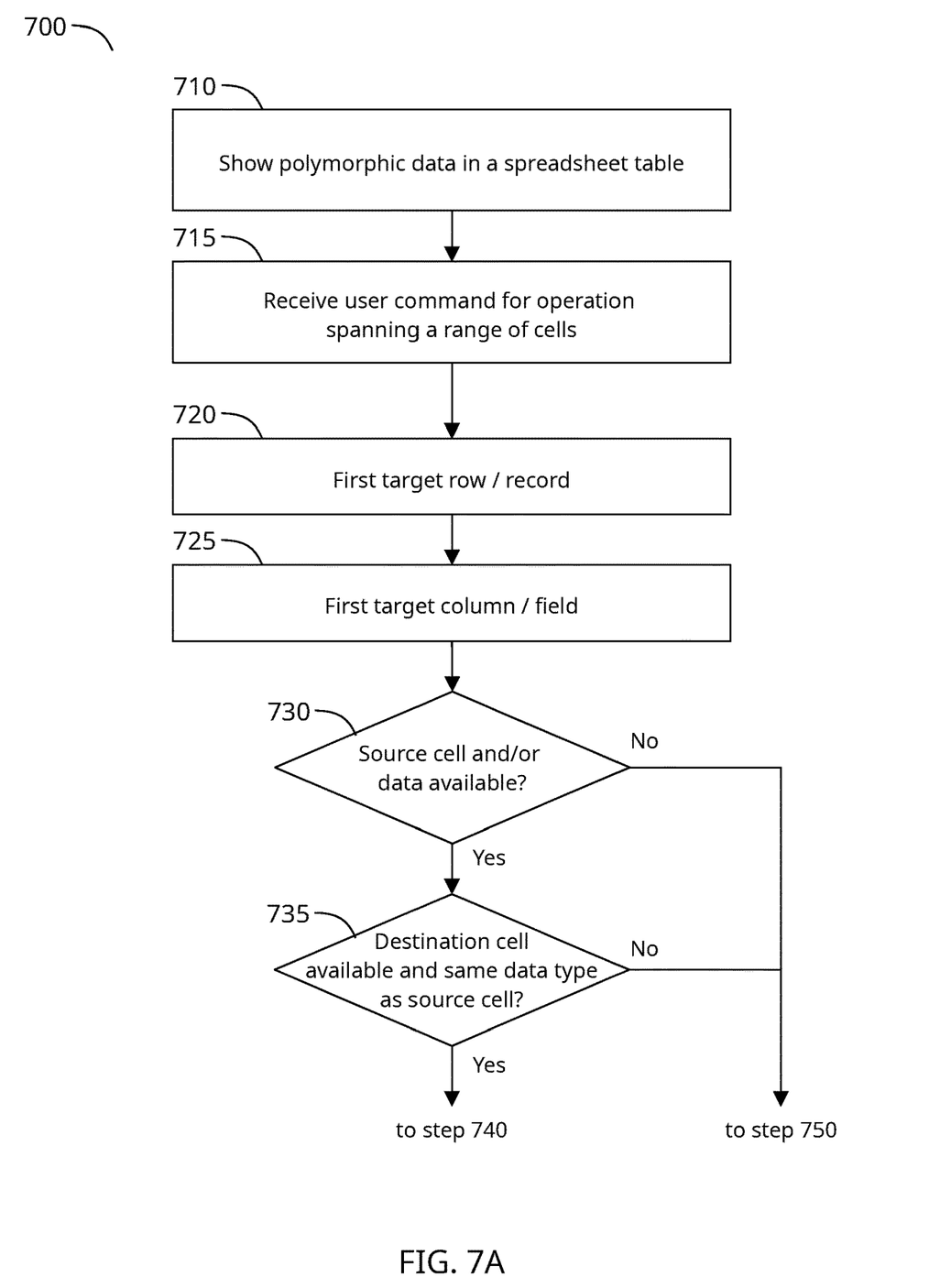
FIGS. 7A-B illustrates an example method for processing a multiple-cell operation on polymorphic records displayed in a spreadsheet according to an embodiment of the invention.
Figure 7B:
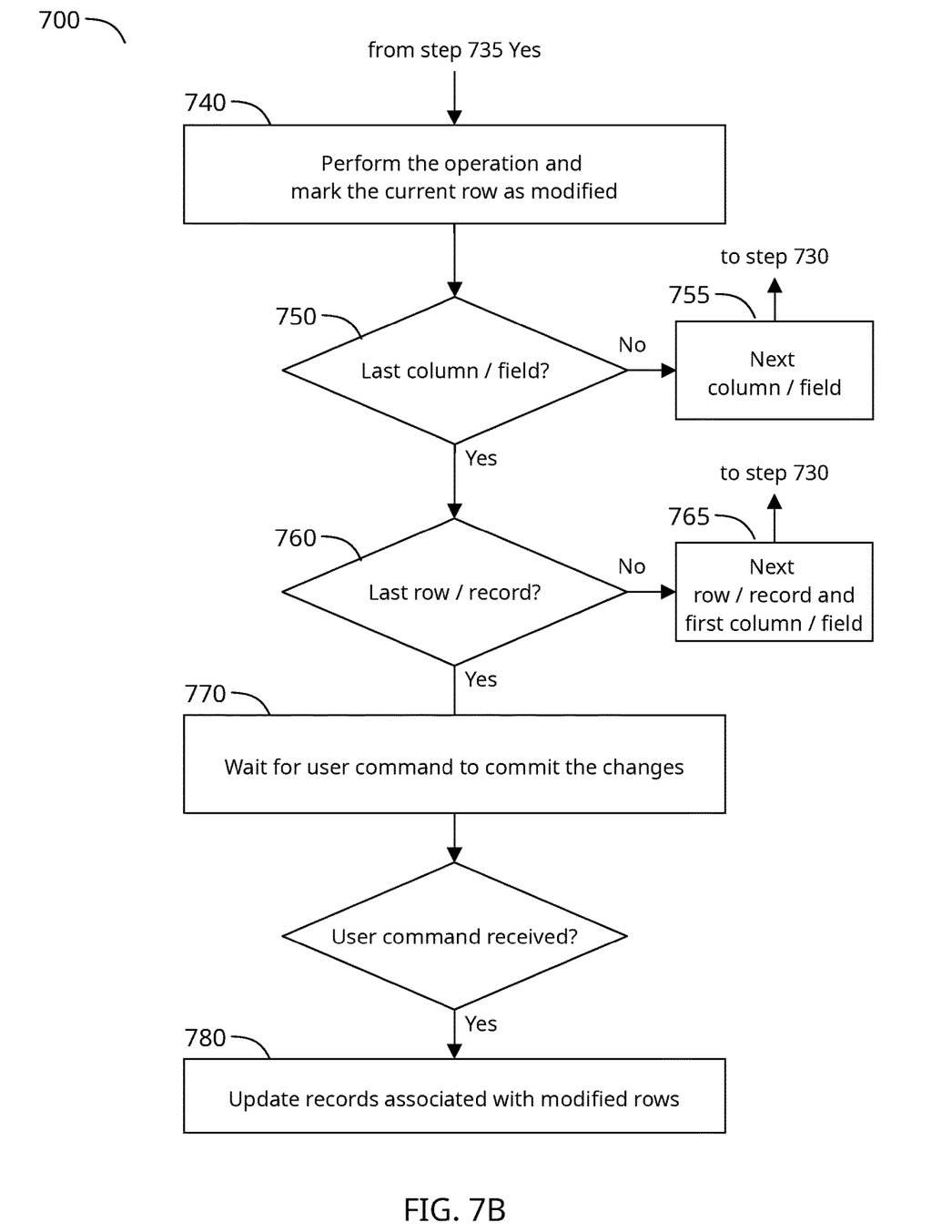

FIGS. 7A-B illustrates an example method 700 for processing a multiple-cell operation on polymorphic records displayed in a spreadsheet according to an embodiment of the invention. The example method assumes that the spreadsheet includes cells organized in rows and columns, or groups in a first dimension and groups in a second dimension, and associates columns with fields and rows with records, but another embodiment may associate columns with records and rows with fields. The operation may include a regular spreadsheet operation, such as copy, paste, delete, fill, etc., and it may include a database operation, e.g. via a web service request such as a REST request. Method 700 includes the following steps.

Step 710—showing multiple records from a polymorphic data source in a spreadsheet table. An embodiment may use method 600, or similar, to display data from a polymorphic data source in the fashion of FIG. 4, or similar.

Step 715—receiving a user command for an operation on a range of cells spanning one or more rows (from a first target row to a last target row) and spanning one or more columns (from a first target column to a last target column).

Step 720—marking the first target row as the current row and the record associated with the first target row as the current record.

Step 725—marking the first target column as the current column and the field associated with the first target column as the current field. The intersection of the current row and the current column determines the current cell.

Step 730—if the operation requires a source cell and/or source data, determining if a source cell and/or source data are available. For example, a copy operation requires a source cell. If a range of cells associated with context-sensitive data is copied, not all cells may be available. A paste operation requires source data, which may come from a source cell or from elsewhere. Upon determining that neither a source cell nor source data are available while the operation requires a source cell and/or source data, proceeding with Step 750.

Step 735—determining if a destination cell is needed and available and, if the operation requires a data type match, determining if the current cell has a data type that matches a data type of the source cell and/or that matches a data type of the source data. For example, a paste operation requires that a destination cell is available, and that its data type matches the source data type. Upon determining that there is no destination cell available, and/or there is no data type match while the operation requires a data type match, proceeding to Step 750.

Step 740—performing the operation on the current cell; if the operation changes the current cell, marking the current row as modified or updating the current record. For example, a copy operation would not change the current cell, and therefore the current record is not updated and the current row is not marked as modified. In contrast, a paste or fill operation could change the current cell, in which case the current record is updated, or the current row is marked as modified.

Step 750—determining if the current column is the last target column.

Step 755—upon determining that the current column is not the last target column, marking a next target column as the current column and the field associated with the current column as the current field, and returning to Step 730.

Step 760—upon determining that the current column is the last target column, determining if the current row is the last target row.

Step 765—upon determining that the current row is not the last target row, marking a next target row as the current row, and the first target column as the current column, marking the record associated with the current row as the current record and the field associated with the current column as the current field, and returning to Step 730.

Step 770—upon determining that the current row is the last target row, displaying the modified spreadsheet. If the embodiment has marked any rows as modified, waiting for a user command to commit changes in the modified rows. Some embodiments may display modifications in the spreadsheet no earlier than Step 770, whereas other embodiments may display modifications as they occur in prior steps, or asynchronously. All embodiments, in Step 770, wait for a user command to commit changes in the modified rows.

Step 780—upon receiving the user command to commit changes in the modified rows, updating records associated with modified rows at the data source. The update may include a database command, such as a REST request.

Figure 8:
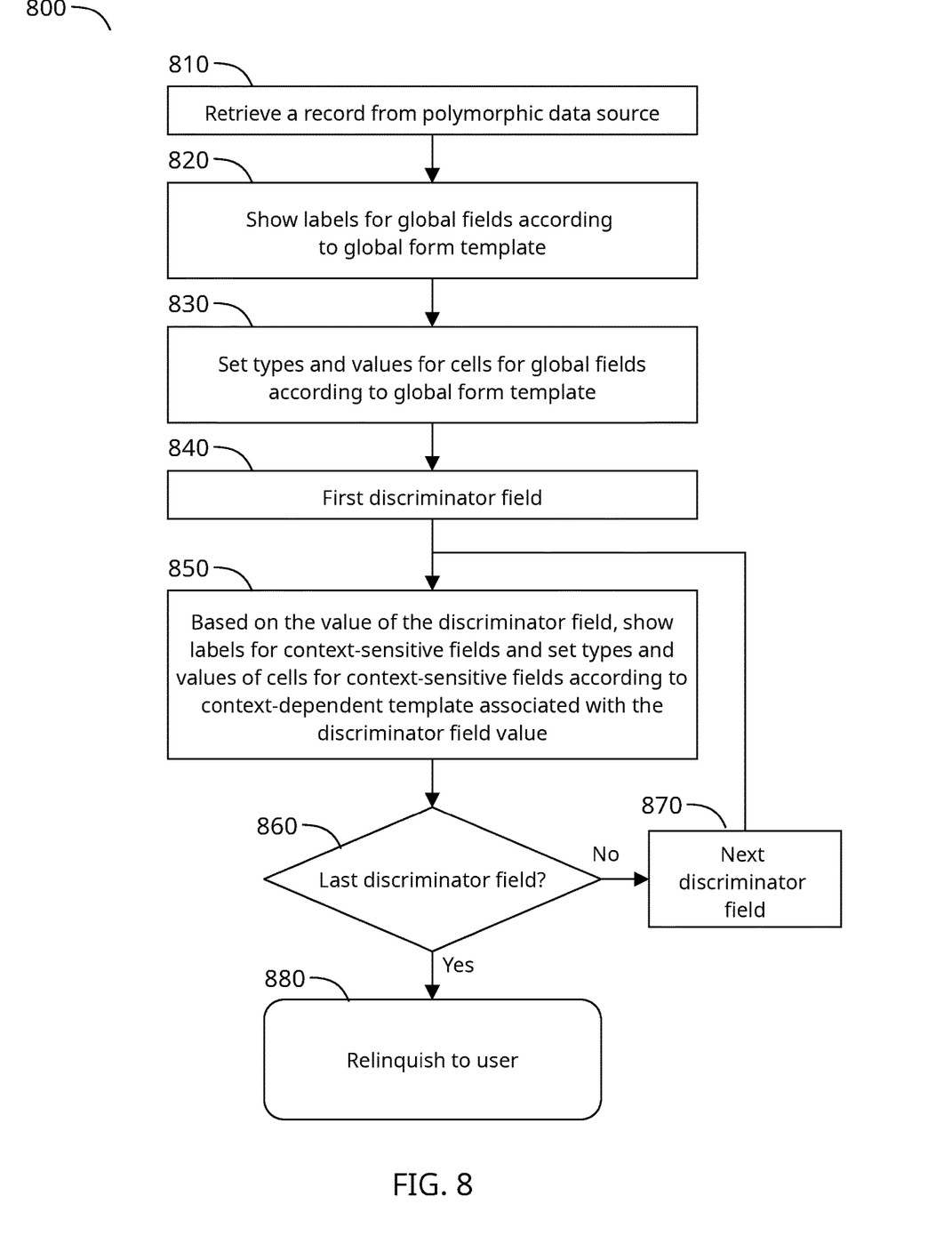
FIG. 8 illustrates an example method for displaying a polymorphic record in a spreadsheet form view according to an embodiment of the invention.

FIG. 8 illustrates an example method 800 for displaying a record from a polymorphic data source in a spreadsheet form view according to an embodiment of the invention. The spreadsheet form comprises spreadsheet cells each including a data type and a value. The record could, for example, look similar to polymorphic record 320 and the spreadsheet form view could, for example, look similar to form 500. Method 800 comprises the following steps.

Step 810—retrieving a record from the polymorphic data source. The record may include global fields, including one or more discriminator fields, and context-sensitive fields whose availability depends on a value of one of the one or more discriminator fields.

Step 820—showing labels for global fields according to a global form template. A label may be or include a text identifying a global field in a way that a user can understand what a value of a global field represents. A label may be shown as a text in a spreadsheet cell, for example a cell adjacent to a cell that shows the value of the global field, or the label may be shown as a text box or other widget placed in or on the spreadsheet form view. A label may, instead of or in addition to showing a text, show an icon or any other visual or otherwise distinctive mark that helps a user understand the meaning of global field values shown. The global form template associates one or more spreadsheet cells to one or more respective global field values, and includes information where and how the labels are shown. Some embodiments retrieve service metadata that includes the global form template.

Step 830—setting data types for spreadsheet cells associated with global fields in accordance with the global form type, and setting values for the spreadsheet cells associated with global fields in accordance with values for the respective global fields in the record.

Step 840—marking a first of the one or more discriminator fields as a current discriminator field.

Step 850—based on a value of the current discriminator field, showing labels for context-sensitive fields and setting data types and values of spreadsheet cells associated with context-sensitive fields according to a context-dependent template associated with the current discriminator field value. The context-dependent template associated with the current discriminator field value associates one or more spreadsheet cells with respective context-sensitive fields, and includes labels for the context-sensitive fields. Some embodiments retrieve service metadata that provides information to determine the record structure. The service metadata may include polymorphic information (global fields, discriminator fields, context-sensitive fields, and a mapping between discriminator field values and context-sensitive fields). The service data may further include the context-dependent templates. The embodiment may further include dynamically redrawing a spreadsheet form when a user changes a discriminator field value, including the relevant context-sensitive fields from a new context-dependent template associated with the new discriminator field value.

Step 860—determining if the current discriminator field is a last of the one or more discriminator fields.

Step 870—upon determining that the current discriminator field is not the last of the one or more discriminator fields, marking a next of the one or more discriminator fields as the current discriminator field and returning to Step 850.

Step 880—upon determining that the current discriminator field is the last of the one or more discriminator fields, displaying the spreadsheet form view and relinquishing control to the user. Some embodiments may show updates in the spreadsheet for view no earlier than Step 880, whereas other embodiments may show updates as they occur in the prior steps, or asynchronously. All embodiments, in Step 880, relinquish control to the user.

Figure 9:
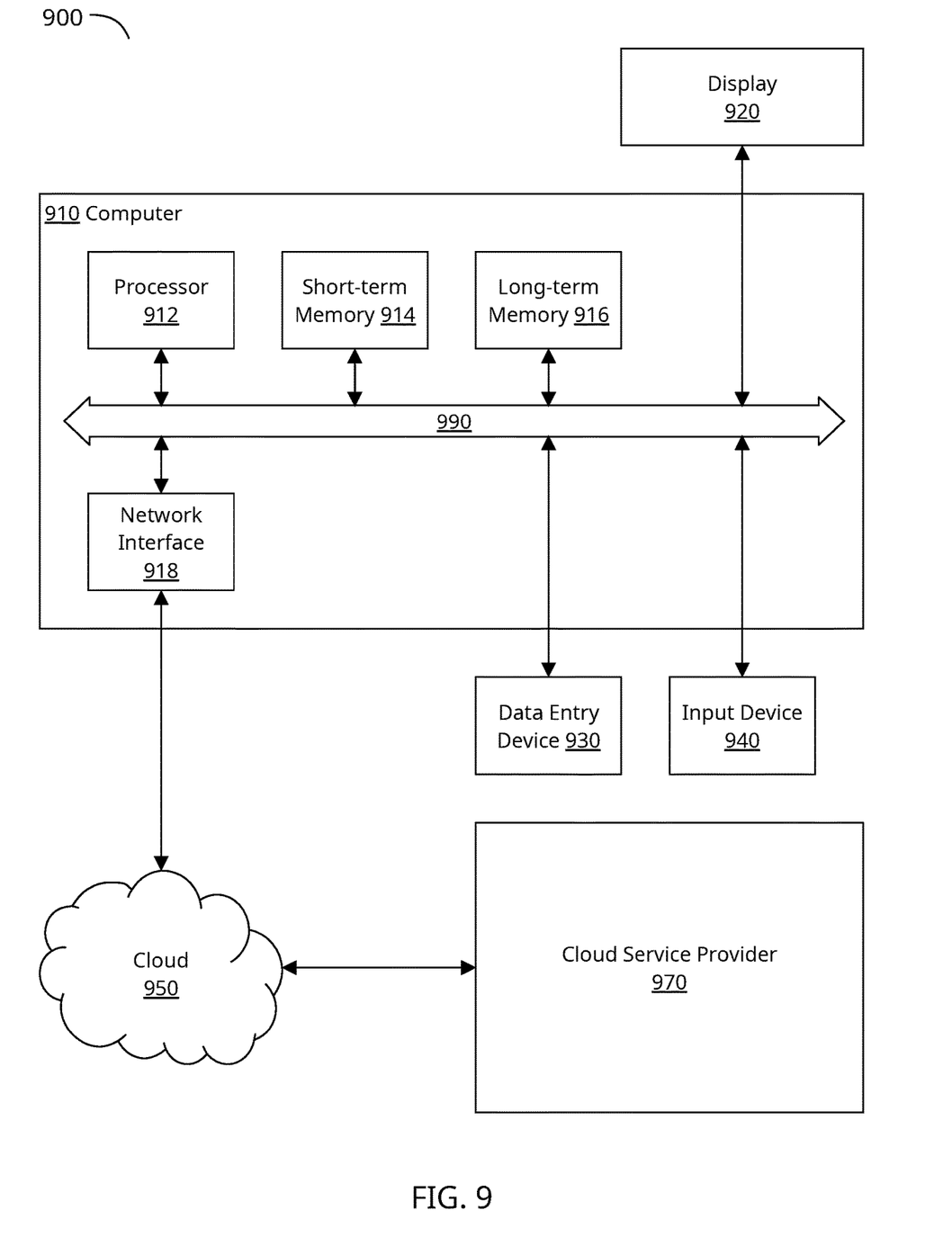
FIG. 9 illustrates an example client device suitable for performing operations according to embodiments of the invention.

FIG. 9 illustrates an example client device 900 suitable for performing operations according to embodiments of the invention. Client device 900 includes computer 910 with display 920, data entry device 930, and input device 940. It communicates with cloud service provider 970 via cloud 950.

Computer 910 includes processor 912, short-term memory 914, non-transitory long-term memory 916, and network interface 918, which communicate with each other via data bus 990. They may also directly or indirectly communicate with display 920, data entry device 930, and input device 940 via data bus 990. Computer 910 may take any of the many forms in which computers are available, including a notebook computer, a desktop computer, a tablet, a smartphone, and other device that includes a processor, a short-term memory, a long-term memory, a network interface, and a data bus.

Embodiments perform the methods described with reference to FIGS. 6-8 on computer 910, for display on display 920. In some cases, display 920 may be bundled with computer 910 as a single system (e.g., in case of a notebook computer, a smartphone, and a tablet), and in some cases display 920 may be externally coupled to computer 910.

Considerations

Although the description has been described with respect to particular embodiments thereof, these particular embodiments are merely illustrative, and not restrictive. For example, the text and figures show spreadsheet tables where columns are associated with fields and rows are associated with records. However, different embodiments may associate rows with fields and columns with records.

Any suitable programming language can be used to implement the routines of particular embodiments including C#, Visual Basic, OpenOffice BASIC, Python, C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method to display records from a polymorphic data source in a spreadsheet table on a display screen of a computer, wherein:

the spreadsheet table includes cells organized in a first dimension and a second dimension that are orthogonal to each other;

the computer performs the method and shows the spreadsheet table in a graphical user interface on the display screen; and the spreadsheet table associates cells with records in the first dimension and with fields in the second dimension;

the method comprising:

(a) retrieving one or more records from the polymorphic data source;

(b) associating a first of the one or more retrieved records with a first group of cells in the first dimension, marking the first of the one or more retrieved records as a current record, and marking the first group of cells in the first dimension as a current group in the first dimension;

and for successive records from the one or more records:

(c) determining a record structure based on a discriminator field value in the current record, wherein the record structure specifies available fields and unavailable context-sensitive fields; and (d) associating a field in the current record with a cell in the current group in the first dimension, marking a cell associated with an unavailable context-sensitive field as unavailable, and marking a cell associated with an available field as available.

2. The method of claim 1, further comprising:

(e) making the cell marked as unavailable visually distinct from the cell marked as available;

(f) setting a data type and a value of the cell marked as available in accordance with an associated field in the current record;

(g) determining if a last of the one or more retrieved records has been associated with the group of cells in the first dimension; and (h) upon determining that the last of the one or more retrieved records has not been associated with the group of cells in the first dimension, associating a next of the one or more retrieved records with a next group of cells in the first dimension, marking the next of the one or more retrieved records as the current record, and marking the next group of cells in the first dimension as the current group in the first dimension, and returning to step (c).

3. The method of claim 2, further comprising:

(i) receiving a user command for an operation spanning one or more target groups of cells in the first dimension and one or more target groups of cells in the second dimension;

(j) marking a first of the one or more target groups of cells in the first dimension as a current target group in the first dimension and marking a record associated with the current target group in the first dimension as a current target record;

(k) marking a first of the one or more target groups of cells in the second dimension as the current target group in the second dimension and marking a field associated with the current target group in the second dimension as a current target field;

(l) determining whether (i) a source cell for the operation is available; (ii) source data for the operation is available; (iii) the source cell for the operation is required; and (iv) the source data for the operation is required;

(m) upon determining that the source cell and/or the source data is required for the operation, and neither the source cell nor the source data is available for the operation, proceeding to step (q);

(n) determining if a destination cell is needed and available, determining if the operation requires a match between a data type of a destination cell and a data type of the source cell and/or the source data, and determining if the data type of the destination cell matches the data type of the source cell and/or the source data;

(o) upon determining that a destination cell is needed but not available, proceeding to step (q); upon determining that the operation requires a match, but no match is available, proceeding to step (q);

(p) performing the operation on a current cell, wherein the current cell is included in the current target group in the first dimension and in the current target group in the second dimension, and, if the operation changes the current cell, marking the current target group in the first dimension as modified;

(q) determining if the current target group in the second dimension is a last of the one or more target groups of cells in the second dimension;

(r) upon determining that the current target group in the second dimension is not the last of the one or more target groups of cells in the second dimension, marking a next of the one or more target groups of cells in the second dimension as the current target group in the second dimension, marking a field associated with the current target group in the second dimension as the current target field, and returning to step (l);

(s) determining if the current target group in the first dimension is a last of the one or more target groups of cells in the first dimension;

(t) upon determining that the current target group in the first dimension is not the last of the one or more target groups of cells in the first dimension, marking the next of the one or more target groups of cells in the first dimension as the current target group in the first dimension, marking a record associated with the current target group in the first dimension as the current target record, and returning to step (l);

(u) if any target group of cells in the first dimension has been marked as modified, waiting for a user command to commit a change in the target group of cells in the first dimension; and (v) upon receiving the user command to commit the change in the target group of cells in the first dimension, updating records associated with modified target groups of cells in the first dimension at the polymorphic data source.

4. The method of claim 3, wherein the polymorphic data source comprises a database.

5. The method of claim 3 wherein retrieving the record and updating a record comprise a web service request.

6. The method of claim 2, wherein the polymorphic data source comprises records with one or more global fields including one or more discriminator fields, and one or more context-sensitive fields, wherein a context-sensitive field is either available or unavailable depending on a value of one of the one or more discriminator fields.

7. The method of claim 2, wherein a row in the spreadsheet table includes a group of cells grouped in the first dimension, and a column in the spreadsheet table includes a group of cells grouped in a second dimension.

8. The method of claim 2, wherein a column in the spreadsheet table includes a group of cells grouped in the first dimension, and a row in the spreadsheet table includes a group of cells grouped in a second dimension.

9. The method of claim 2, further comprising disabling an unavailable field.

10. A method for displaying a record from a polymorphic data source in a spreadsheet form on a display screen of a computer, wherein:

the computer performs the method and shows the spreadsheet form in a graphical user interface on the display screen;

the spreadsheet form comprises spreadsheet cells each including a data type and a value; and the polymorphic data source comprises records comprising one or more global fields including one or more discriminator fields, and comprising one or more context-sensitive fields, wherein a context-sensitive field is either available or unavailable depending on a value of one of the one or more discriminator fields;

the method comprising:
- (a) retrieving the record from the polymorphic data source;
- (b) displaying a first label associated with one of the one or more global fields in the spreadsheet form, in accordance with a global template associated with the polymorphic data source, wherein the global template includes a location in the spreadsheet form where the first label is displayed;
- (c) setting the data type and the value of at least one of the spreadsheet cells to a data type and a value of the one of the one or more global fields, wherein a location of the at least one spreadsheet cell is included in the global template;
- (d) marking a first of the one or more discriminator fields as a current discriminator field;
- (e) determining a current discriminator field value and based on the current discriminator field value, retrieving a first context-dependent template, wherein the first context-dependent template is associated with the polymorphic data source; and
- (f) displaying a second label associated with one of the one or more context-sensitive fields, in the spreadsheet form in accordance with the first context-dependent template, wherein the one of the one or more context-sensitive fields is an available context-sensitive field and wherein the first context-dependent template determines a location in the spreadsheet form where the second label is displayed.

11. The method of claim 10, further comprising:
- (g) determining if the current discriminator field is a last of the one or more discriminator fields; and
- (h) upon determining that the current discriminator field is not the last of the one or more discriminator fields, marking a next of the one or more discriminator fields as the current discriminator field and returning to step (e).

12. The method of claim 11 further including retrieving service metadata including polymorphic information, the global template, and two or more context-dependent templates.

13. The method of claim 11 wherein a label associated with a field identifies the field to a user; is shown in a cell adjacent to a cell that shows a field value; and includes at least one of a text, an icon, or a distinctive mark.

14. A system to display records from a polymorphic data source in a spreadsheet table including cells on a display screen of a computer, wherein the spreadsheet table includes cells organized in a first dimension and a second dimension that are orthogonal to each other, the system comprising:
- a data storage device with non-transitory memory storing the polymorphic data;
- an application server operable to access the data storage device and the polymorphic data;
- a web server operable to provide access to the application server through a data network; and
- a client device operable to access the web server through the data network, wherein the client device includes one or more processors, a short-term memory, a non-transitory long-term memory, a network interface coupled to the data network, a data bus coupled with the one or more processors, short-term memory, long-term memory, network interface, and is coupled directly or indirectly with the display screen, wherein the one or more processors execute software instructions to display the spreadsheet table on the display screen, and the software instructions are operable to:
  - (a) retrieve one or more records from the polymorphic data source;
  - (b) associate a first of the one or more retrieved records with a first group of cells in the first dimension, mark the first of the one or more retrieved records as a current record, and mark the first group of cells in the first dimension as a current group in the first dimension;
  - and for successive records from the one or more records:
  - (c) determine a record structure based on a discriminator field value in the current record, wherein the record structure specifies available fields and unavailable context-sensitive fields; and
  - (d) associate a field in the current record with a cell in the current group in the first dimension, mark a cell associated with an unavailable context-sensitive field as unavailable, and mark a cell associated with an available field as available.

15. The system of claim 14, wherein the software instructions are further operable to:
- (e) make the cell marked as unavailable visually distinct from the cell marked as available;
- (f) set a data type and a value of the cell marked as available in accordance with an associated field in the current record;
- (g) determine if a last of the one or more retrieved records has been associated with the group of cells in the first dimension; and
- (h) upon determining that the last of the one or more retrieved records has not been associated with the group of cells in the first dimension, associate a next of the one or more retrieved records with a next group of cells in the first dimension, mark the next of the one or more retrieved records as the current record, mark the next group of cells in the first dimension as the current group in the first dimension, and return to step (c).

16. The system of claim 15, wherein the software instructions are further operable to:
- (i) receive a user command for an operation spanning one or more target groups of cells in the first dimension and one or more target groups of cells in the second dimension;
- (j) mark a first of the one or more target groups of cells in the first dimension as a current target group in the first dimension and mark a record associated with the current target group in the first dimension as a current target record;
- (k) mark a first of the one or more target groups of cells in the second dimension as the current target group in the second dimension and marking a field associated with the current target group in the second dimension as a current target field;
- (l) determine whether (i) a source cell for the operation is available; (ii) source data for the operation is available; (iii) a source cell for the operation is required; and (iv) source data for the operation is required;
- (m) upon determining that the source cell and/or the source data is required for the operation, and neither the source cell nor the source data is available for the operation, proceed to step (q);
- (n) determine if a destination cell is needed and available, determine if the operation requires a match between a data type of a destination cell and a data type of the source cell and/or the source data, and determine if the data type of the destination cell matches the data type of the source cell and/or the source data;
- (o) upon determining that a destination cell is needed but not available, proceed to step (q); upon determining that the operation requires a match, but no match is available, proceed to step (q);

(p) perform the operation on a current cell, wherein the current cell is included in the current target group in the first dimension and in the current target group in the second dimension, and, if the operation changes the current cell, mark the current target group in the first dimension as modified to form a modified target group of cells in the first dimension;

(q) determine if the current target group in the second dimension is a last of the one or more target groups of cells in the second dimension;

(r) upon determining that the current target group in the second dimension is not the last of the one or more target groups of cells in the second dimension, mark a next of the one or more target groups of cells in the second dimension as the current target group in the second dimension, mark a field associated with the current target group in the second dimension as the current target field, and return to step (l);

(s) determine if the current target group in the first dimension is a last of the one or more target groups of cells in the first dimension;

(t) upon determining that the current target group in the first dimension is not the last of the one or more target groups of cells in the first dimension, marking a next of the one or more target groups of cells in the first dimension as the current target group in the first dimension, marking a record associated with the current target group in the first dimension as the current target record, and return to step (l);

(u) if any target group of cells in the first dimension has been marked as modified, wait for a user command to commit a change in the target group of cells in the first dimension; and (v) upon receiving the user command to commit changes in the modified target group of cells in the first dimension, update a record associated with a target group of cells in the first dimension at the data source.

17. The system of claim 15, wherein a row in the spreadsheet table includes a group of cells grouped in the first dimension, and a column in the spreadsheet table includes a group of cells grouped in a second dimension.

18. The system of claim 15, wherein a column in the spreadsheet table includes a group of cells grouped in the first dimension, and a row in the spreadsheet table includes a group of cells grouped in a second dimension.

19. The system of claim 15, wherein the records comprise one or more global fields including one or more discriminator fields, and comprise one or more context-sensitive fields, wherein a context-sensitive field is either available or unavailable depending on a value of one of the one or more discriminator fields.

20. The system of claim 19, wherein the software instructions are further operable to:

(w) retrieve a record from the polymorphic data source;

(x) display a first label, associated with one of the one or more global fields, in a spreadsheet form, in accordance with a global template associated with the polymorphic data source, wherein the global template determines a location in the spreadsheet form where the first label is displayed, and wherein the spreadsheet form comprises spreadsheet cells each including a data type and a value;

(y) set a the data type and the value of at least one of the spreadsheet cells to a data type and value of the one of the one or more global fields, wherein a location of the at least one spreadsheet cell is included in the global template;

(z) mark a first of the one or more discriminator fields as a current discriminator field;

(aa) determine the current discriminator field value and, based on the current discriminator field value, retrieve a first context-dependent template, wherein the first context-dependent template is associated with the polymorphic data source;

(bb) display a second label associated with one of the one or more context-sensitive fields, in the spreadsheet form in accordance with the first context-dependent template, wherein the one of the one or more context-sensitive fields is an available context-sensitive field and wherein the first context-dependent template determines a location in the spreadsheet form where the second label is displayed;

(cc) determine if the current discriminator field is a last of the one or more discriminator fields; and (dd) upon determining that the current discriminator field is not the last of the one or more discriminator fields, mark a next of the one or more discriminator fields as the current discriminator field and return to step (aa).

21. A tangible non-transitory processor-readable medium including instructions executable by one or more processors to display records from a polymorphic data source in a spreadsheet table on a display screen of a computer, wherein:

the spreadsheet table includes cells organized in a first dimension and a second dimension that are orthogonal to each other;

the computer shows the spreadsheet table in a graphical user interface on the display screen;

the spreadsheet table associates cells with records in the first dimension and with fields in the second dimension;

and wherein the instructions when executed are operable for:

(a) retrieving one or more records from the polymorphic data source;

(b) associating a first of the one or more retrieved records with a first group in the first dimension, marking the first of the one or more retrieved records as a current record, and marking the first group in the first dimension as a current group in the first dimension;

and for successive records from the one or more records:

(c) determining a record structure based on a discriminator field value in the current record, wherein the record structure specifies available fields and unavailable context-sensitive fields; and (d) associating a field in the current record with a cell in the current group in the first dimension, marking a cell associated with an unavailable context-sensitive field as unavailable, and marking a cell associated with an available field as available.

22. The tangible non-transitory processor-readable medium of claim 21, wherein the instructions when executed are further operable for:

(e) making the cell marked as unavailable visually distinct from the cell marked as available;

(f) setting a data type and a value of the cell marked as available in accordance with an associated field in the current record;

(g) determining if a last of the one or more retrieved records has been associated with a group in the first dimension; and (h) upon determining that the last of the one or more retrieved records has not been associated with a group in the first dimension, associating a next of the one or more retrieved records with a next group in the first dimension, marking the next of the one or more retrieved records as the current record, and marking the next group in the first dimension as the current group in the first dimension, and returning to step (c).

23. The tangible non-transitory processor-readable medium of claim 22, wherein the instructions when executed are further operable for:

(i) receiving a user command for an operation spanning one or more target groups of cells in the first dimension and one or more target groups of cells in the second dimension;

(j) marking a first of the one or more target groups of cells in the first dimension as a current target group in the first dimension and marking a record associated with the current target group in the first dimension as a current target record;

(k) marking a first of the one or more target groups of cells in the second dimension as the current target group in the second dimension and marking a field associated with the current target group in the second dimension as a current target field;

(l) determining whether (i) a source cell for the operation is available; (ii) source data for the operation is available; (iii) a source cell for the operation is required; and (iv) source data for the operation is required;

(m) upon determining that the source cell and/or the source data is required for the operation, and neither the source cell nor the source data is available for the operation, proceeding to step (q);

(n) determining if a destination cell is needed and available, determining if the operation requires a match between a data type of a destination cell and a data type of the source cell and/or the source data, and determining if the data type of the destination cell matches the data type of the source cell and/or the source data;

(o) upon determining that a destination cell is needed but not available, proceeding to step (q); upon determining that the operation requires a match, but no match is available, proceeding to step (q);

(p) performing the operation on a current cell, wherein the current cell is included in the current target group in the first dimension and in the current target group in the second dimension, and, if the operation changes the current cell, marking the current target group in the first dimension as modified;

(q) determining if the current target group in the second dimension is a last of the one or more target groups of cells in the second dimension;

(r) upon determining that the current target group in the second dimension is not the last of the one or more target groups of cells in the second dimension, marking a next of the one or more target groups of cells in the second dimension as the current target group in the second dimension, marking a field associated with the current target group in the second dimension as the current target field, and returning to step (l);

(s) determining if the current target group in the first dimension is a last of the one or more target groups of cells in the first dimension;

(t) upon determining that the current target group in the first dimension is not the last of the one or more target groups of cells in the first dimension, marking a next of the one or more target groups of cells in the first dimension as the current target group in the first dimension, marking a record associated with the current target group in the first dimension as the current target record, and returning to step (l);

(u) if any target group of cells in the first dimension has been marked as modified, waiting for a user command to commit a change in the target group of cells in the first dimension; and (v) upon receiving the user command to commit the change in the target group of cells in the first dimension, updating records associated with modified target groups of cells in the first dimension at the source of the polymorphic data.

24. The tangible non-transitory processor-readable medium of claim 22, wherein the polymorphic data source provides records comprising one or more global fields including one or more discriminator fields, and one or more context-sensitive fields, wherein a context-sensitive field is either available or unavailable depending on a value of one of the one or more discriminator fields.

* * * * *

UNITED STATES PATENT AND TRADEMARK OFFICE
CERTIFICATE OF CORRECTION

| | | |
|---|---|---|
| PATENT NO. | : 12,014,139 B2 | Page 1 of 1 |
| APPLICATION NO. | : 18/114608 | |
| DATED | : June 18, 2024 | |
| INVENTOR(S) | : Von Tish et al. | |

It is certified that error appears in the above-identified patent and that said Letters Patent is hereby corrected as shown below:

In the Claims

In Column 17, Line 66, in Claim 20, delete "a the" and insert -- a --, therefor.

Signed and Sealed this
First Day of October, 2024

Katherine Kelly Vidal
*Director of the United States Patent and Trademark Office*